United States Patent
Ohtsuka et al.

(10) Patent No.: US 8,263,241 B2
(45) Date of Patent: Sep. 11, 2012

(54) METHOD FOR MANUFACTURING SECONDARY BATTERY AND METHOD FOR PREPARING POSITIVE ELECTRODE ACTIVE MATERIAL FOR SECONDARY BATTERY

(75) Inventors: Yu Ohtsuka, Osaka (JP); Nobuhiko Hojo, Osaka (JP)

(73) Assignee: Panasonic Corporation, Osaka (JP)

( * ) Notice: Subject to any disclaimer, the term of this patent is extended or adjusted under 35 U.S.C. 154(b) by 1001 days.

(21) Appl. No.: 12/295,992

(22) PCT Filed: Apr. 5, 2007

(86) PCT No.: PCT/JP2007/057636
§ 371 (c)(1),
(2), (4) Date: Oct. 3, 2008

(87) PCT Pub. No.: WO2007/116926
PCT Pub. Date: Oct. 18, 2007

(65) Prior Publication Data
US 2009/0094822 A1 Apr. 16, 2009

(30) Foreign Application Priority Data
Apr. 5, 2006 (JP) .................. 2006-103768

(51) Int. Cl.
| H01M 10/44 | (2006.01) |
| H01M 4/13 | (2010.01) |
| H01M 4/60 | (2006.01) |
| H01M 4/58 | (2010.01) |
| H01M 4/02 | (2006.01) |
| H01M 4/29 | (2006.01) |
| C01C 1/00 | (2006.01) |
| C01G 49/00 | (2006.01) |
| C01G 45/12 | (2006.01) |
| C01D 1/02 | (2006.01) |

(52) U.S. Cl. ............ 429/52; 429/213; 429/231.95; 423/594.1; 423/594.6; 423/599; 205/57; 205/58; 205/59

(58) Field of Classification Search ............ 429/52, 429/213, 231.95; 423/594.1, 594.6, 599; 205/57–59
See application file for complete search history.

(56) References Cited

U.S. PATENT DOCUMENTS
5,324,599 A 6/1994 Oyama et al.
(Continued)

FOREIGN PATENT DOCUMENTS
EP 0 797 263 A2 9/1997
(Continued)

OTHER PUBLICATIONS
Machine translation for JP 2003045496 A (Feb. 2003).*

*Primary Examiner* — Eugenia Wang
(74) *Attorney, Agent, or Firm* — McDermott Will & Emery LLP

(57) ABSTRACT

A method for producing a secondary cell according to the present invention includes step (A) of putting a solution having an electrochemically reversibly oxidizable/reducible organic compound and a supporting electrolyte dissolved therein into contact with a positive electrode active material, thereby oxidizing or reducing the positive electrode active material; and step (B) of accommodating the oxidized positive electrode active material and a negative electrode active material in a case in the state of facing each other with a separator being placed therebetween, and filling the case with an electrolyte solution. By oxidizing or reducing the positive electrode active material, lithium ions or anions as the support electrode are incorporated into the positive electrode active material.

14 Claims, 3 Drawing Sheets

U.S. PATENT DOCUMENTS

| | | |
|---|---|---|
| 6,580,599 B2 | 6/2003 | Matsuo |
| 6,866,964 B2 | 3/2005 | Nakahara et al. |
| 7,282,298 B2 | 10/2007 | Inatomi et al. |
| 2005/0019670 A1 * | 1/2005 | Amine et al. ............ 429/326 |

FOREIGN PATENT DOCUMENTS

| | | |
|---|---|---|
| EP | 1 416 553 A1 | 5/2004 |
| JP | 1-178517 | 7/1989 |
| JP | 2-274888 | 11/1990 |
| JP | 3-55760 | 3/1991 |
| JP | 5-54887 | 3/1993 |
| JP | 5-74459 | 3/1993 |
| JP | 8-195199 | 7/1996 |
| JP | 10-154512 | 6/1998 |
| JP | 10-188981 | 7/1998 |
| JP | 11-31531 | 2/1999 |
| JP | 11-86847 | 3/1999 |
| JP | 2002-151084 | 5/2002 |
| JP | 2002-222739 | 8/2002 |
| JP | 2003045496 A * | 2/2003 |
| JP | 2004-111374 | 4/2004 |

* cited by examiner

METHOD FOR MANUFACTURING SECONDARY BATTERY AND METHOD FOR PREPARING POSITIVE ELECTRODE ACTIVE MATERIAL FOR SECONDARY BATTERY

RELATED APPLICATIONS

This application is the U.S. National Phase under 35 U.S.C. §371 of International Application No. PCT/JP2007/057636, filed on Apr. 5, 2007, which in turn claims the benefit of Japanese Application No. 2006-103768, filed on Apr. 5, 2006, the disclosures of which Applications are incorporated by reference herein.

TECHNICAL FIELD

The present invention relates to a method for producing a secondary cell and a method for preparing a positive electrode active material for a secondary cell.

BACKGROUND ART

As mobile communication devices and mobile electronic devices have become widely used recently, demands for power sources usable for these devices are significantly increasing. Lithium secondary cells are in wide use as power sources for these devices owing to the larger electromotive force, high energy density and reusability thereof.

In order to improve the ease of carrying around the mobile communication devices and mobile electronic devices, lithium secondary cells which provide larger outputs and are more lightweight are needed, and studies are now conducted to find electrode materials fulfilling such needs. In order to decrease the weight of the lithium secondary cells, it is considered to use an organic compound as an electrode material because the specific gravity of an organic compound is about 1 g/cm$^3$ and is smaller than that of lithium cobalt oxide, which is currently used as a positive electrode active material.

In a charged state of a lithium secondary cell, lithium ions are incorporated into a negative electrode to reduce the lithium ions. By contrast, in a positive electrode of the lithium secondary cell, a positive electrode active material is oxidized. In this step, depending on the oxidation state of the positive electrode active material, lithium ions may be separated from the positive electrode, or anions are incorporated into the positive electrode. In a discharged state of the lithium secondary cell, lithium in the negative electrode is oxidized to separate the lithium ions from the negative electrode. In the positive electrode, along with the reduction of the positive electrode active material, lithium ions may be incorporated into the positive electrode, or anions may be separated from the positive electrode.

For example, Patent Document 1 proposes using, as a positive electrode active material, a conductive polymer containing a quinone-based functional group having an oxidation/reduction activity in a structure thereof. Patent Document 2 proposes using, as a positive electrode active material, an organic compound having a disulfide group. Patent Document 3 proposes using, as a positive electrode active material or an electrode material, a polymer of 2,5-pyridinediyl, which is a pyridine compound having one carbon of a benzene ring substituted with nitrogen.

Where an organic compound having a disulfide group in a molecule thereof or a polymer compound of pyridinediyl mentioned above is used as a positive electrode active material of a lithium secondary cell, such a compound is reduced in a discharged state and thus lithium ions are coordinated. The lithium ions are provided from the negative electrode. In the case where the negative electrode is formed of a material which does not contain lithium ions, lithium ions need to be incorporated into the positive electrode or the negative electrode in advance.

Patent Document 4 proposes using an organic compound having a fulvalene structure as a positive electrode active material. Patent Document 5 proposes using an organic compound having a radical group as an active material of a secondary cell.

In the case where the organic compound disclosed in Patent Document 4 is used as positive electrode active material, the organic compound is oxidized in a charged state and anions having a negative electric charge are bonded or coordinated as counter ions. For example, in the case where lithium hexafluorophosphate is used as an electrolyte salt, the reaction in the positive electrode is represented by expression (1) below and the reaction in the negative electrode is represented by expression (2) below. In the expressions, R is the organic compound disclosed in Patent Document 4, and R* is a negative electrode active material.

$$R + PF_6^- \rightarrow [R^+PF_6^-] + e^- \tag{1}$$

$$R^* + Li^+ + e^- \rightarrow [R^{*-}Li^+] \tag{2}$$

As is understood from the above, the reactions in the electrodes involve counter ions as well as the active materials. In addition, both anions and cations respectively move to the positive electrode and the negative electrode to cause electrode reactions. This indicates that the capacity of the secondary cell depends on the amount of the electrode salt such as lithium ions or anions as well as the mass of the active materials in the electrodes.

Especially in the case where a non-aqueous solvent is used for an electrolyte solution, the solubility of lithium ions or anions is about 1 to 2 M. Even if the energy density is desired to be increased, there is a limitation on the concentration at which such an electrolyte is dissolved in the solvent. Because of such a situation, it is considered to produce a secondary cell in the state where such ions are incorporated into the positive electrode or the negative electrode in advance, in order to increase the ion concentration in the cell.

In the case where graphite or aluminum is used for the negative electrode, lithium ions incorporated by the first cycle of charge partially remain incorporated into the negative electrode and form an initial irreversible capacity referred to as "retention". Such a part of lithium ions is not involved in the reactions caused by charge/discharge. As a result, the lithium ion concentration in the cell is decreased. At this point, anions of the same electric charge level are incorporated into the positive electrode. In order to compensate for the ions which become non-involved in the reactions, it is considered to produce a secondary cell in the state where such ions are incorporated into the positive electrode or the negative electrode in advance.

As described above, it has been proposed to produce a secondary cell in the state where lithium ions or anions are incorporated into the positive electrode or the negative electrode in advance, in order to incorporate lithium ions into the positive electrode or the negative electrode or in order to compensate for the ions which become non-involved in the reactions. Methods for producing the secondary cell in this manner are roughly classified into three: (1) method using a chemical reaction, (2) physical method, and (3) electrochemical method.

(1) Method using a chemical reaction: Patent Document 6 discloses using a chemical reaction to incorporate ions into an electrode material. For this, an irreversible chemical reaction is used. Specifically, lithium acetylide-ethylene diamine complex and $LiCoO_2$ or the like which is a positive electrode active material are put into contact with each other, thereby reducing, mainly, Co of $LiCoO_2$ and thus incorporating Li ions in the lithium acetylide-ethylene diamine complex into $LiCoO_2$.

(2) Physical method: Patent Document 7 discloses pasting a material to be used as counter ions directly to an electrode to cause a physical contact, thereby incorporating ions thereinto. Specifically, it is disclosed that lithium metal is put into direct contact with a negative electrode formed of graphite.

(3) Electrochemical method: Patent Document 8 discloses putting a positive electrode into an electrolyte solution together with a counter electrode and flowing an electric current between the positive electrode and the counter electrode using an external power source, thereby reducing the positive electrode and thus incorporating lithium ions into the positive electrode. The positive electrode having the lithium ions incorporated thereinto is built into a secondary cell together with a negative electrode, and thus the secondary cell is produced.

Patent Document 1: Japanese Laid-Open Patent Publication No. 10-154512
Patent Document 2: Japanese Laid-Open Patent Publication No. 05-074459
Patent Document 3: Japanese Laid-Open Patent Publication No. 1-178517
Patent Document 4: Japanese Laid-Open Patent Publication No. 2004-111374
Patent Document 5: Japanese Laid-Open Patent Publication No. 2002-151084
Patent Document 6: Japanese Laid-Open Patent Publication No. 5-54887
Patent Document 7: Japanese Laid-Open Patent Publication No. 11-86847
Patent Document 8: Japanese Laid-Open Patent Publication No. 11-31531

DISCLOSURE OF THE INVENTION

Problems to be Solved by the Invention

The method of Patent Document 6 has problems, for example, that the lithium acetylide-ethylene diamine complex is changed by a chemical reaction and thus is not reusable and may possibly be contaminated with impurities irrelevant to the cell reaction, and that it is difficult to control the reduced state of Co.

It is also considered to dissolve a compound having lithium ions of butyl lithium or the like in an organic solvent and put this solution into contact with a positive electrode active material, thereby incorporating the lithium ions into the positive electrode active material. By this method, however, butyl lithium is consumed by the reaction and is not reusable. Accordingly, each time lithium ions are incorporated into the positive electrode active material, the organic solvent needs to be replaced.

The method of Patent Document 7 has problems, for example, that the Li concentration is different between in the vicinity of the area which has been put into contact with lithium metal and in the other area, and that a long time is required until Li is diffused to have a uniform concentration distribution. In addition, when the Li ion concentration is not uniform in the cell, the charging depth distribution in the cell becomes non-uniform. As a result, the cell deteriorates along with the progress of charge/discharge cycles.

Moreover, this method imposes a limitation on usable active materials because Li metal is used. Specifically, this method is usable only to incorporate lithium into a negative electrode material and is not usable to incorporate lithium ions into the positive electrode.

With the method of Patent Document 8, lithium ions are incorporated into the positive electrode uniformly. However, this method requires that a secondary cell should be first assembled in order to incorporate lithium ions and then the secondary cell should be substantially charged while the current and the voltage are controlled using an external device. This method requires a large scale charging apparatus, and is not considered as being simple.

The present invention, made to solve these problems of the conventional art, has an object of providing a method for producing a large capacity secondary cell by incorporating lithium ions or anions into a positive electrode active material uniformly by a simple process and a method for preparing a positive electrode active material for a secondary cell.

Means for Solving the Problems

A method for producing a secondary cell according to the present invention includes step (A) of putting a solution having an electrochemically reversibly oxidizable/reducible organic compound and a supporting electrolyte dissolved therein into contact with a positive electrode active material, thereby oxidizing or reducing the positive electrode active material; and step (B) of accommodating the oxidized positive electrode active material and a negative electrode active material in a case in the state of facing each other with a separator being placed therebetween, and filling the case with an electrolyte solution.

A method for preparing a positive electrode active material for a secondary cell according to the present invention includes step (A) of putting a solution having an electrochemically reversibly oxidizable/reducible organic compound and a supporting electrolyte dissolved therein into contact with a positive electrode active material, thereby oxidizing or reducing the positive electrode active material.

In a preferable embodiment, the step (A) further comprises the step of immersing an electrode containing the organic compound and a counter electrode in the solution having the supporting electrolyte dissolved therein, and applying a voltage between the electrode and the counter electrode, thereby oxidizing or reducing the organic compound and thus dissolving the organic compound in the solution.

In a preferable embodiment, the organic compound is at least one selected from the group consisting of an organic compound having a quinone group in a molecule thereof, an organic compound having a sulfide group in a molecule thereof, an organic compound having a pyrimidine structure in a molecule thereof, an organic compound having a nitroxy radical group in a molecule thereof, and an organic compound having a π conjugated electron cloud in a molecule thereof.

In a preferable embodiment, the organic compound is a low molecular weight compound.

In a preferable embodiment, the organic compound has a tetrathiafulvalene structure.

In a preferable embodiment, the organic compound is bis-ethylenedithiotetrathiafulvalene.

In a preferable embodiment, the positive electrode active material is at least one selected from bisethylenedithiotetrathiafulvalene, $LiCoO_2$, $LiNiO_2$ and $LiMn_2O_4$.

In a preferable embodiment, in the step (A), the solution is flown with respect to, and thus put into contact with, the positive electrode active material.

Effects of the Invention

According to the present invention, by immersing a positive electrode active material in a solution having an organic compound in an oxidized or reduced state and a supporting electrolyte dissolved therein, the positive electrode active material can be oxidized or reduced to incorporate lithium ions or anions thereinto. Owing to this, the concentration of the lithium ions or anions in the secondary cell is increased. Hence, a large capacity secondary cell can be realized.

DESCRIPTION OF THE REFERENCE NUMERALS

Figure 1:
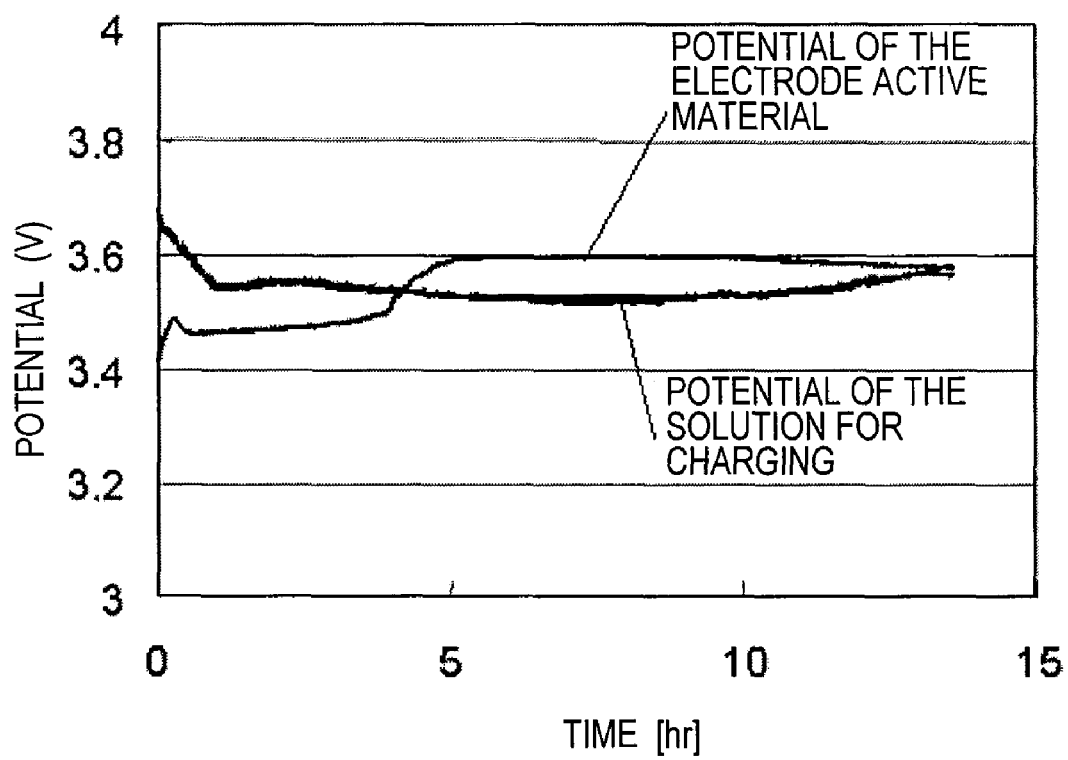
FIG. 1 shows a potential change in the case where the positive electrode active material is oxidized by a method in Example 1.

21 Case
22 Current collecting plate
23 Positive electrode
24 Separator
25 Opening sealing plate
26 Negative electrode
27 Current collecting plate
28 Gasket

BEST MODE FOR CARRYING OUT THE INVENTION

According to a method for preparing a positive electrode active material for a secondary cell of the present invention, a solution having an electrochemically reversibly oxidizable/reducible organic compound and a supporting electrolyte dissolved therein is put into contact with a positive electrode active material, thereby oxidizing or reducing the positive electrode active material. Along with the oxidation or reduction of the positive electrode active material, anions or lithium ions are incorporated into the positive electrode active material.

For preparing a positive electrode active material having anions incorporated thereinto, a charged state of a secondary cell needs to be realized. Namely, the positive electrode active material is oxidized to incorporate anions.

For this purpose, the positive electrode active material in a reduced state and an organic compound in an oxidation state are put into contact with each other. Specifically, first, an organic compound which is oxidation/reduction-reactable electrochemically reversibly is dissolved in a solution while the organic compound is in an oxidation state. When the positive electrode active material in a reduced state is put into contact with the solution, electron transfer occurs between the oxidized organic compound in the solution and the positive electrode active material in the reduced state. The electron transfer progresses until the potential of the organic compound becomes equal to the potential of the positive electrode active material. In this step, along with the oxidation of the positive electrode active material, anions are incorporated into the positive electrode active material such that the electric charge level is kept constant. For example, where the organic compound and the positive electrode active material are respectively represented with $R_O$ and $R_C$ and $PF_6^-$ is used as the anions, the reaction represented by expression (4) below occurs, and the anions ($PF_6^-$) are incorporated into the positive electrode active material.

$$R_O^+PF_6^- + R_C \rightarrow R_O + R_C^+PF_6^- \quad (4)$$

The reaction progresses until the potential of the organic compound becomes equal to the potential of the positive electrode active material. Therefore, the potential in an equilibrium state can be adjusted by appropriately selecting the organic compound and the oxidation state of the organic compound.

For preparing a positive electrode active material having lithium ions incorporated thereinto, a discharged state of a secondary cell needs to be realized. Namely, the positive electrode active material is reduced to incorporate lithium ions.

For this purpose, the positive electrode active material in an oxidation state and an organic compound in a reduced state are put into contact with each other. Specifically, first, an organic compound which is oxidation/reduction-reactable electrochemically reversibly is dissolved in a solution and is reduced. When the positive electrode active material in an oxidation state is put into contact with the solution, electron transfer occurs between the reduced organic compound in the solution and the positive electrode active material in the oxidation state. The electron transfer progresses until the potential of the organic compound becomes equal to the potential of the positive electrode active material. In this step, the reaction represented by expression (5) below occurs. Along with the reduction of the positive electrode active material, lithium ions are incorporated into the positive electrode active material such that the electric charge level is kept constant.

$$Li^+R_O^- + R_C \rightarrow R_O + Li^+R_C^- \quad (5)$$

Similar to the above, the reaction progresses until the potential of the organic compound becomes equal to the potential of the positive electrode active material. Therefore, the potential in an equilibrium state can be adjusted by appropriately selecting the organic compound and the oxidation state of the organic compound. Such reactions progress as long as there is a potential difference between the organic compound in the solution and the positive electrode active material.

According to a method for preparing a positive electrode active material for a secondary cell of the present invention, the oxidation state (charging depth) of the positive electrode active material can be controlled by the potential of the organic compound in the solution, and the reaction speed can be determined by the concentration or the temperature. The reactions of expressions (4) and (5) depend on the potential of the organic compound in the solution and the potential of the positive electrode active material, and are not restricted by the type of the organic compound or the combination of the organic compound and the positive electrode active material. During the reactions of expressions (4) and (5), it is preferable that the organic compound is not decomposed, does not cause any side reaction with the active material, and does not generate any precipitate as a solid substance after the oxidation/reduction reaction.

According to a method for preparing a positive electrode active material for a secondary cell of the present invention, the positive electrode active material can be oxidized or reduced and thus the lithium ions or anions can be incorporated into the positive electrode active material, only by putting the electrode into contact with the solution. Therefore, this step only requires an apparatus for oxidizing or reducing the organic compound in the solution, and does not require a charge/discharge apparatus for each electrode.

In addition, the organic compound can be reversibly oxidized or reduced. For this reason, the solution for oxidizing or reducing the positive electrode active material can be used in repetition by electrically oxidizing or reducing the organic compound in the solution. A tank for oxidizing or reducing the positive electrode active material and a tank for electrically oxidizing or reducing the organic compound to reproduce the organic compound are provided, and the solution is circulated between the tanks. Thus, the organic compound can be continuously reproduced.

Hereinafter, a method for preparing an active material for a secondary cell according to the present invention will be specifically described. An oxidizable/reducible organic compound usable in the present invention is represented by any of general formulas (1) through (18) shown below. Two or more of the compounds represented by these formulas may be mixed for use.

It is preferable that these compounds are low molecular weight compounds, i.e., not high molecular weight compounds. Herein, a high molecular weight compound is a compound having a molecular weight of about 10000 to 100000, and has a property of being less likely to be dissolved in a solvent such as an electrolyte solution than a low molecular weight compound. In the present invention, it is necessary that an organic compound for oxidizing or reducing a positive electrode active material should be dissolved in a solvent. Therefore, it is preferable to use a low molecular weight compound generally having a high solubility than a high molecular weight compound having a low solubility.

An oxidizable/reducible organic compound usable for a method for preparing an active material for a secondary cell according to the present invention is represented by any of general formulas (1) through (18).

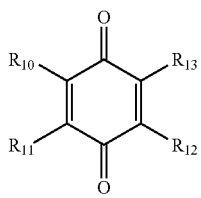

General formula (1)

In the formula. $R_{10}$ through $R_{13}$ are each hydrogen, fluorine, an alkyl group or an aliphatic group, and may contain nitrogen, oxygen, silicon or the like. The aliphatic group may be of a straight chain or form a ring. $R_{10}$ through $R_{13}$ may be the same as, or different from, one another.

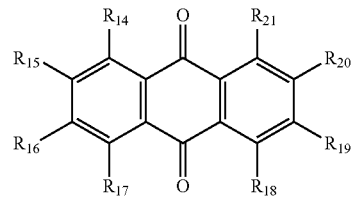

General formula (2)

In the formula, $R_{14}$ through $R_{21}$ are each hydrogen, fluorine, an alkyl group or an aliphatic group, and may contain nitrogen, oxygen, silicon or the like. The aliphatic group may be of a straight chain or form a ring. $R_{14}$ through $R_{21}$ may be the same as, or different from, one another.

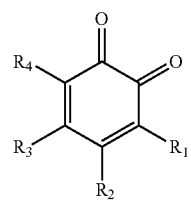

General formula (3)

In the formula, $R_1$ through $R_4$ are each hydrogen, fluorine, an alkyl group or an aliphatic group, and may contain nitrogen, oxygen, silicon or the like. The aliphatic group may be of a straight chain or form a ring. $R_1$ through $R_4$ may be the same as, or different from, one another.

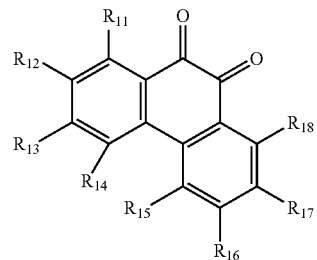

General formula (4)

In the formula, $R_{11}$ through $R_{18}$ are each hydrogen, fluorine, an alkyl group or an aliphatic group, and may contain nitrogen, oxygen, silicon or the like. The aliphatic group may be of a straight chain or form a ring. $R_{11}$ through $R_{18}$ may be the same as, or different from, one another.

The compounds represented by general formulas (1) through (4) each have a quinone group. These compounds, for example, the compound of reacts as follows.

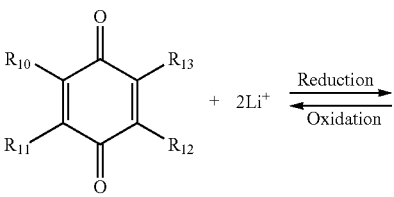

general formula 1

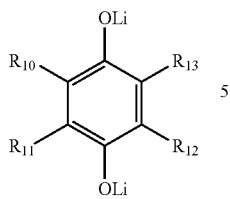

General formula (5)

In the formula, $R_1$ and $R_2$ are each hydrogen or alkaline metal such as lithium.

General formula 6

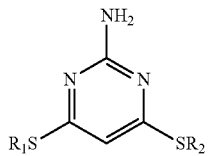

In the formula, $R_1$ and $R_2$ are each hydrogen or alkaline metal such as lithium.

The compounds represented by general formulas (5) and (6) each have a sulfide group. These compounds, for example, the compound of reacts as follows.

general formula 5

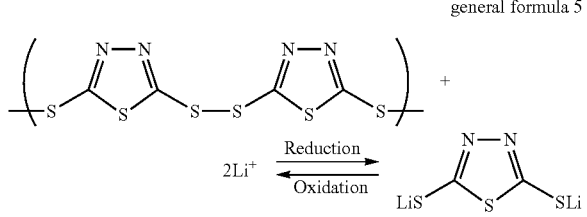

General formula 7

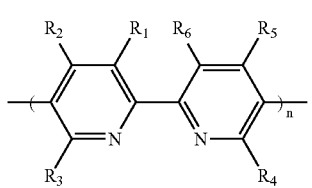

In the formula, $R_1$ through $R_6$ are each hydrogen, fluorine, an alkyl group or an aliphatic group, and may contain nitrogen, oxygen, silicon or the like. The aliphatic group may be of a straight chain or form a ring. $R_1$ through $R_6$ may be the same as, or different from, one another.

General formula 8

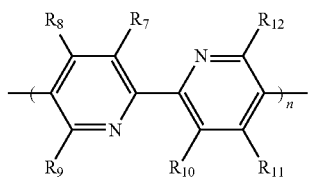

In the formula, $R_7$ through $R_{12}$ are each hydrogen, fluorine, an alkyl group or an aliphatic group, and may contain nitrogen, oxygen, silicon or the like. The aliphatic group may be of a straight chain or form a ring. $R_7$ through $R_{12}$ may be the same as, or different from, one another.

General formula 9

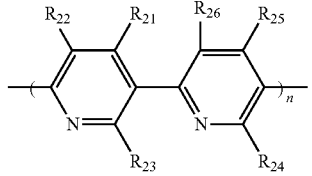

In the formula, $R_{21}$ through $R_{26}$ are each hydrogen, fluorine, an alkyl group or an aliphatic group, and may contain nitrogen, oxygen, silicon or the like. The aliphatic group may be of a straight chain or form a ring. $R_{21}$ through $R_{26}$ may be the same as, or different from, one another.

General formula 10

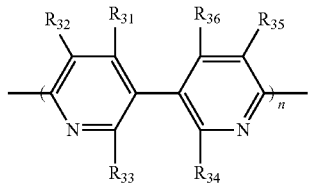

In the formula, $R_{31}$ through $R_{36}$ are each hydrogen, fluorine, an alkyl group or an aliphatic group, and may contain nitrogen, oxygen, silicon or the like. The aliphatic group may be of a straight chain or form a ring. $R_{31}$ through $R_{36}$ may be the same as, or different from, one another.

General formula 11

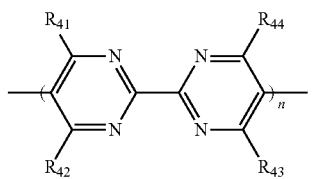

In the formula, $R_{41}$ through $R_{44}$ are each hydrogen, fluorine, an alkyl group or an aliphatic group, and may contain nitrogen, oxygen, silicon or the like. The aliphatic group may be of a straight chain or form a ring. $R_{41}$ through $R_{44}$ may be the same as, or different from, one another.

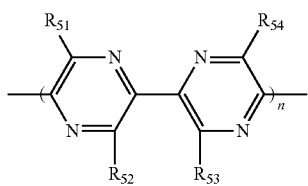

General formula 12

In the formula, $R_{51}$ through $R_{54}$ are each hydrogen, fluorine, an alkyl group or an aliphatic group, and may contain nitrogen, oxygen, silicon or the like. The aliphatic group may be of a straight chain or form a ring. $R_{31}$ through $R_{54}$ may be the same as, or different from, one another.

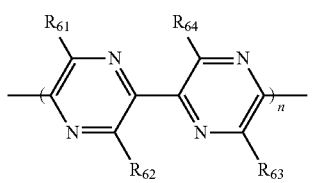

General formula 13

In the formula, $R_{61}$ through $R_{64}$ are each hydrogen, fluorine, an alkyl group or an aliphatic group, and may contain nitrogen, oxygen, silicon or the like. The aliphatic group may be of a straight chain or form a ring. $R_{61}$ through $R_{64}$ may be the same as, or different from, one another.

The compounds represented by general formulas (7) through (13) each have a pyrimidine structure. These compounds, for example, the compound of reacts as follows.

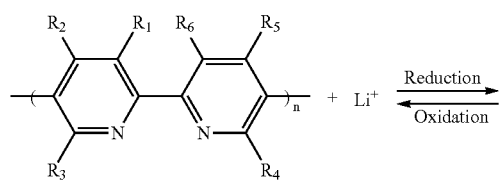

general formula 7

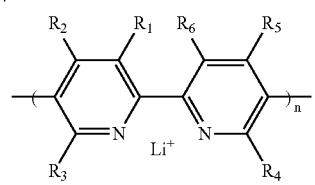

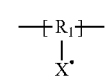

General formula 14

In the formula, $R_1$ is a substituted or non-substituted alkylene group or arylene group, and X is an oxy radical group, a nitroxy radical group, or a hydrazyl radical group.

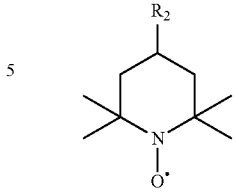

General formula 15

In the formula, $R_2$ is a hydrogen atom, or a substituted or non-substituted aliphatic or aromatic hydrocarbon group, halogen group, hydroxyl group, nitro group, nitroso group, cyano group, alkoxy group, aryloxy group or acyl group.

The compounds represented by general formulas (14) and (15) each have an oxy radical group, a nitroxy radical group or a hydrazyl radical group. These compounds, for example, the compound of reacts as follows.

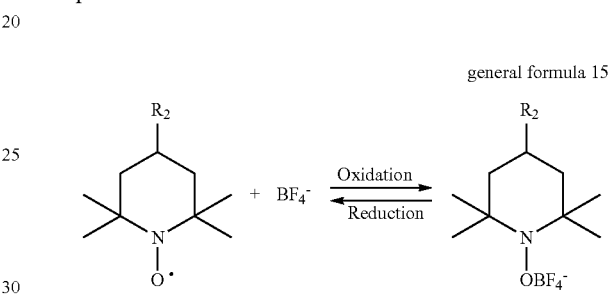

general formula 15

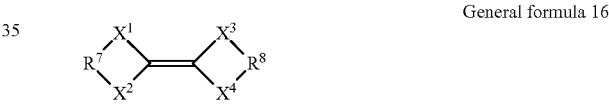

General formula 16

In the formula, $X^1$ through $X^4$ are each a sulfur or nitrogen atom, and may be the same as, or different from, one another. In the formula, $R^7$ and $R^8$ are each an alkyl group or an aliphatic group. The alkyl group may be chain-like or ring-like, and may contain one or more oxygen, nitrogen, sulfur, silicon, phosphorus, boron or halogen. $R^7$ and $R^8$ may be the same as, or different from, each other.

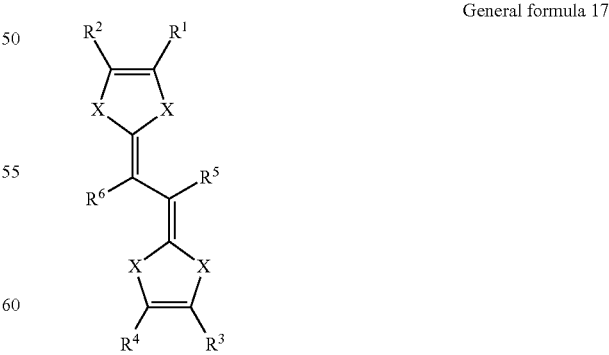

General formula 17

In the formula, X is a sulfur atom or an oxygen atom, $R^1$ through $R^4$ are each independently a chain-like aliphatic group, a ring-like aliphatic group, a hydrogen atom, a hydroxyl group, a cyano group, an amino group, a nitro group or a nistroso group. $R^5$ and $R^6$ are each a hydrogen atom, a chain-like aliphatic group or a ring-like aliphatic group. Each of the aliphatic groups contains at least one selected from the group consisting of an oxygen atom, a nitrogen atom, a sulfur atom, a silicon atom, a phosphorus atom, a boron atom and a halogen atom.

General formula 18

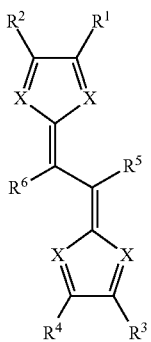

In the formula, X is a nitrogen atom. $R^1$ through $R^4$ are each independently a chain-like aliphatic group, a ring-like aliphatic group, a hydrogen atom, a hydroxyl group, a cyano group, an amino group, a nitro group or a nistroso group. $R^5$ and $R^6$ are each a hydrogen atom, a chain-like aliphatic group or a ring-like aliphatic group. Each of the aliphatic groups contains at least one selected from the group consisting of an oxygen atom, a nitrogen atom, a sulfur atom, a silicon atom, a phosphorus atom, a boron atom and a halogen atom.

The compounds represented by general formulas (16) through (18) each have an oxidation/reduction-reactable π conjugated electron cloud in a molecule thereof. Especially, an organic compound, having a tetrathiafulvalene structure represented by general formula (16) in which $X^1$ through $X^4$ are each sulfur and $R^7$ and $R^8$ are each an allyl group, has 14 π electrons in a molecule thereof and also has a π conjugated electron cloud structure conformed to Hückel's rule. The two-electron oxidation state of the tetrathiafulvalene structure is in a 6π electron state with one 5-member ring. One electron can be oxidized from one 5-member ring. Accordingly, the tetrathiafulvalene structure in which two 5-member rings are connected to each other causes a two-electron oxidation/reduction reaction as follows.

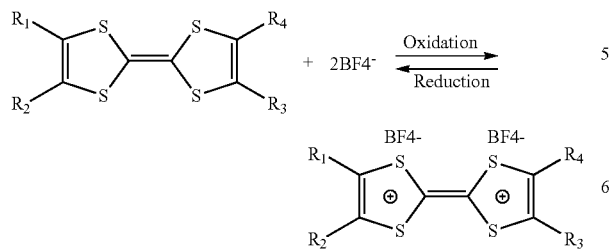

Specifically, the compounds represented by general formula (1) shown above include, for example, a compound represented by formula (19).

Formula 19

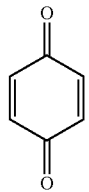

Specifically, the compounds represented by general formula (2) shown above include, for example, a compound represented by formula (20).

Formula 20

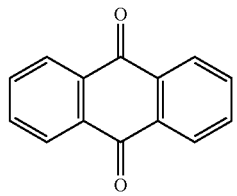

Specifically, the compounds represented by general formula (3) shown above include, for example, a compound represented by formula (21).

Formula 21

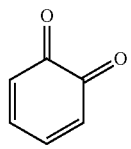

Specifically, the compounds represented by general formula (4) shown above include, for example, a compound represented by formula (22).

Formula 22

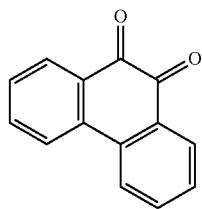

Specifically, the compounds represented by general formula (7) shown above include, for example, a compound represented by formula (23).

Formula 23

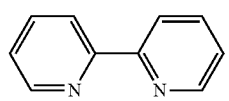

Specifically, the compounds represented by general formula (11) shown above include, for example, a compound represented by formula (24).

Formula 24

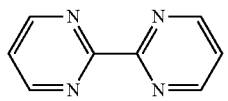

Specifically, the compounds represented by general formula (15) shown above include, for example, a compound represented by formula (25) and a compound represented by formula (26).

Formula 25

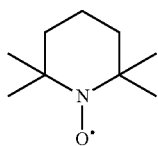

Formula 26

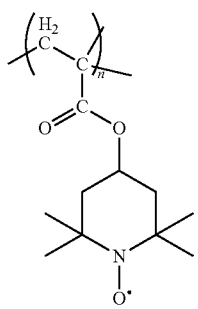

Specifically, the compounds represented by general formula (16) shown above include, for example, a compound represented by general formula (27) and a compound represented by general formula (28).

General formula 27

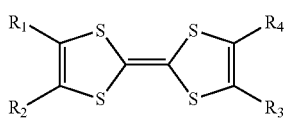

In the formula, $R_1$ through $R_4$ are each an alkyl group or an aliphatic group. The alkyl group may be chain-like or ring-like, and may contain one or more oxygen, nitrogen, sulfur, silicon, phosphorus, boron or halogen. $R_1$ through $R_4$ may be the same as, or different from, one another.

General formula 28

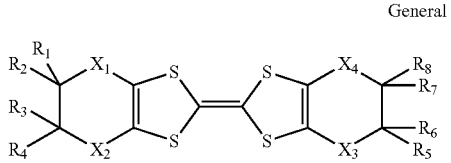

In the formula, $X_1$ through $X_4$ are each a sulfur, oxygen, nitrogen, or carbon atom, and $X_1$ through $X_4$ may be the same as, or different from, one another. In the formula, $R_1$ through $R_8$ may each an alkyl group or an aliphatic group, or two adjacent R groups may form a double bond. The alkyl group may be chain-like or ring-like, and may contain one or more oxygen, nitrogen, sulfur, silicon, phosphorus, boron or halogen. $R_1$ through $R_8$ may be the same as, or different from, one another.

As the solvent for dissolving the organic compound, water or a general non-aqueous solvent is usable. In the case where it is a problem that water reacts with the negative electrode or water is decomposed by charge/discharge in the secondary cell, it is preferable to use a non-aqueous solvent such that the positive electrode active material does not contain water. Specifically, non-aqueous solvents such as, for example, ethylene carbonate, propylene carbonate, dimethyl carbonate, diethyl carbonate, methylethyl carbonate, γ-butyl lactone, tetrahydrofuran, dioxorane, sulforane, dimethylformamide and acetonitrile are preferable. These solvents may be used independently or in a mixed state.

To the solvent for dissolving the organic compound, a supporting electrolyte is added in order to provide ion conductivity like a usual electrolyte solution. Supporting electrolytes used for lithium ion cells or non-aqueous electric double layer capacitors are usable. Such a supporting electrolyte preferably contains ions to be incorporated into the positive electrode active material. Specifically, a salt formed by a combination of any of cations and any of anions mentioned below is usable.

Examples of usable cations include cations of alkaline metal materials such as lithium, sodium, potassium and the like; cations of alkaline earth metal materials such as magnesium and the like; and cations of quaternary ammonium for example, tetraethylammonium or 1,3-ethylmethyl imidazolium. Examples of usable anions include anions of halides, anions of perchloric acid, anions of trifluoromethanesulfonic acid, anions of tetraborofluoride, anions of trifluorophosphohexafluoride, anions of trifluoromethanesulfonic acid, anions of bis(trifluoromethansulfonyl)imide, and anions of bis(perfluoroethylsulfonyl)imide. These cations and anions may be used independently or in a mixed state.

A supporting electrolyte is dissolved in the above-mentioned solvent, and an organic compound represented by any of general formulas (1) through (3) which is at a potential suitable to oxidize or reduce the positive electrode active material is dissolved in the solvent. As long as an organic compound represented by any of general formulas (1) through (3) which is at a potential suitable for the use is dissolved in the solvent, the oxidation state of the organic compound may be adjusted by any method. In order to adjust the potential of the organic compound more accurately, however, the following is preferable. An electrode containing the organic compound represented by any of general formulas (1) through (3) and a counter electrode are immersed in the solvent having the supporting electrolyte dissolved therein and a voltage is applied between the electrode and the counter electrode. Thus, the organic compound contained in the electrode is oxidized or reduced, and the organic compound is dissolved in the solvent.

In order to realize this, an electrode containing an organic compound represented by any of general formulas (1) through (3) is prepared. In order to decrease the electrode resistance, a carbon material such as carbon black, graphite, acetylene black or the like or a conductive polymer such as polyaniline, polypyrrole, polythiophene or the like may be mixed as a conduction assisting agent. As an ion conduction assisting agent, a solid electrolyte such as polyethylene oxide or the like or a gel electrolyte such as polymethyl methacrylate, methyl polymethacrylate or the like may be mixed.

For forming an electrode, a binder may be used in order to improve the bindability of the members of the electrode. Substances usable as the binder include vinylidene polyfluoride, vinylidene fluoride-hexafluoropropylene copolymer, vinylidene fluoride-tetrafluoroethylene copolymer, polytetrafluoroethylene, styrene-butadiene copolymeric rubber, polypropylene, polyethylene, polyimide and the like.

A current collector may be provided in the electrode. Substances usable for the current collector include metal foil or mesh of aluminum, gold, silver, stainless steel, aluminum alloys and the like. The current collector may be coated with carbon or the like in order to decrease the resistance, provide a catalytic effect, or provide a function of chemically or physically binding the active material and the current collector.

For the counter electrode, a substance, such as carbon or the like, which is used for a negative electrode of a general cell is used. Specifically, an active carbon electrode or a crystalline carbon electrode of graphite or the like is usable.

The counter electrode and the electrode containing an organic compound are immersed in the solvent having the supporting electrolyte dissolved therein, and a voltage is applied between the electrodes to flow a current. In accordance with the set level of the voltage, the organic compound contained in the electrode is oxidized and eluted into the solvent, or reduced and eluted into the solvent. The amount of the organic compound to be eluted into the solvent may be adjusted by changing the time period in which the current flows. In this manner, the solution for oxidizing or reducing the positive electrode active material is prepared.

According to a method for preparing a positive electrode active material for a secondary cell of the present invention, a material which is generally in wide use as a positive electrode active material of a lithium secondary cell can be oxidized or reduced to incorporate anions or lithium ions thereinto.

Specifically, an organic compound reactable to incorporate lithium ions, for example, a metal oxide such as $LiCoO_2$, $LiNiO_2$, $LiMn_2O_4$ or the like or a quinone compound can be used as a positive electrode active material and reduced to incorporate lithium ions thereinto. This reaction corresponds to a discharged state of a secondary cell. Alternatively, an organic compound represented by any of general formulas (1) through (13) shown above may be used as a positive electrode active material and reduced to incorporate lithium ions thereinto. In the case where an organic compound represented by any of general formulas (1) through (13) is used as a positive electrode active material, it is preferable that such an organic compound is polymerized and used as a polymer in order to decrease the solubility thereof in an electrolyte solution. These positive electrode active materials are prepared in an oxidation state for use.

Still alternatively, an organic compound represented by any of general formulas (14) through (18) may be used as a positive electrode active material and oxidized to incorporate anions thereinto. Similarly to the above, in the case where an organic compound represented by any of general formulas (14) through (18) is used as a positive electrode active material, it is preferable that such an organic compound is polymerized and used as a polymer in order to decrease the solubility thereof in an electrolyte solution. These positive electrode active materials are prepared in a reduced state for use.

Any of these positive electrode active materials is preferably prepared as a positive electrode for a secondary cell. Therefore, such a positive electrode active material is molded into the form of an electrode together with a conductive material and a binder mentioned above, and a current collector is provided optionally.

A positive electrode active material prepared as a positive electrode is immersed in a solution for oxidizing or reducing the prepared positive electrode active material. As a result, electrons are transferred between the organic compound in the solution and the positive electrode active material to cause an oxidation/reduction reaction. At this point, along with a change in the electric charge level of the positive electrode active material, lithium ions or anions dissolved in the solution as a supporting electrolyte are incorporated into the positive electrode active material. This oxidation/reduction reaction continues until the potential of the organic compound in the solution becomes equal to the potential of the positive electrode active material. Therefore, the amount of ions to be incorporated into the positive electrode active material can be adjusted by varying the concentration and the potential of the organic compound dissolved in the solution. The speed of the oxidation/reduction reaction can be adjusted by the concentration and the temperature.

The amount of lithium ions to be incorporated for compensating for ions forming an initial irreversible capacity and not contributing to charge/discharge in a produced secondary cell, or the amount of lithium ions acting as the electric charge for charge/discharge, namely, the amount of ions to be incorporated into the positive electrode active material in advance can be adjusted by the concentration and the potential of the organic compound dissolved in the solution.

In this way, the positive electrode active material, which is in an oxidation state or a reduced state (corresponding to a charged state or a discharged state of a secondary cell) and has anions or lithium ions incorporated thereinto, can be prepared.

In the solution used for preparing the positive electrode active material, the organic compound is also reduced or oxidized along with the oxidation or reduction of the positive electrode active material. By electrically oxidizing or reducing the organic compound, a solution for oxidizing or reducing the positive electrode active material can be reproduced. For example, a solution, in which the organic compound has been reduced or oxidized along with the oxidation or reduction of the positive electrode active material, is flown by a pump or the like and moved to an area having an electrode for electrically oxidizing or reducing the organic compound. After the organic compound is reproduced, the solution is moved to an area for oxidizing or reducing the positive electrode active material. Thus, the solution is put into contact with the positive electrode active material in a fluid manner to cause an oxidation/reduction reaction. By circulating the solution, continuous reproduction of the solution can be realized.

A secondary cell is produced as follows. The positive electrode containing the prepared positive electrode active material is located to face the negative electrode active material with a separator placed therebetween, and these members are accommodated in a case. The case is filled with an electrolyte solution. Thus, the secondary cell is completed.

As the electrolyte solution for the secondary cell, a solution of a supporting electrolyte mentioned above which is dissolved in a solvent mentioned above is usable. In the case where the electrolyte itself is in the state of a solution, such an electrolyte may be used independently without being mixed with a solvent. A solid electrolyte may also be used. Substances usable as the solid electrolyte include $Li_2S$—$SiS_2$+a ("a" is at least one selected from $Li_3PO_4$, LiI and $Li_4SiO_4$), $Li_2S$—$P_2O_5$, $Li_2S$—$B_2S_5$, $Li_2S$—$P_2S_5$—$GeS_2$, sodium/alumina ($Al_2O_3$), amorphous polyether having a low phase-transition temperature (Tg), amorphous vinylidene fluoride copolymer, a blend of different types of polymers, polyethylene oxide and the like. A preferably usable solid electrolyte is, for example, an ion conductive gel polymer electrolyte obtained by adding a low molecular weight non-aqueous solvent such as ethylene carbonate, propylene carbonate or the like to polyacrylonitrile or a copolymer or crosslinked polymer of ethylene and acrylonitrile, and then adding an electrolyte salt thereto.

Substances usable as the negative electrode active material include graphite, noncrystalline carbon material, lithium metal, lithium-containing composite nitride, lithium-containing titanium oxide, tin (Sn), silicon (Si), silicon oxide, silicon-containing alloy, and silicon composite with carbon or other metal. Activated carbon can also be used for the negative electrode to form a capacitor.

A positive electrode active material prepared by a method for preparing a positive electrode active material for a secondary cell according to the present invention is also preferably usable for primary cells, secondary cells, capacitors, electrolytic capacitors, sensors, electrochromic devices and the like. Such a positive electrode active material is also usable for pre-charging an activated carbon electrode used for an electric double layer capacitor. The reaction mechanism of the electric double layer capacitor is represented by expressions (1) and (2). The concentration of the electrolyte salt in the electrolyte solution greatly changes along with the oxidation/reduction reaction. Because of this, the amount of the electrolyte solution and the concentration of the electrolyte salt restrict the design of the device.

As described above, according to a method for preparing a positive electrode active material for a secondary cell of the present invention, by immersing a positive electrode active material in a solution having an organic compound in an oxidized or reduced state and a supporting electrolyte dissolved therein, the positive electrode active material can be oxidized or reduced to incorporate lithium ions or anions thereinto. Because this reaction occurs in a liquid, the reaction is likely to proceed uniformly and thus ions can be uniformly incorporated into the positive electrode active material. In addition, the oxidation state (charging depth) of the positive electrode active material can be controlled by the potential of the organic compound in the solution. Therefore, the oxidation state of the positive electrode active material or the amount of lithium ions or anions to be incorporated can be accurately controlled.

This step only requires an apparatus for oxidizing or reducing the organic compound in the solution, and does not require a charge/discharge apparatus for each electrode. Therefore, the positive electrode active material can be prepared by a simple apparatus. In addition, the organic compound can be reversibly oxidized or reduced. Owing to this, the solution for oxidizing or reducing the positive electrode active material can be used in repetition by electrically oxidizing or reducing the organic compound in the solution.

In a secondary cell produced using a positive electrode active material prepared in this manner, it is possible to compensate for ions which form an initial irreversible capacity and do not contribute to the reaction and hence are reduced in the concentration. Therefore, a large capacity secondary cell can be realized. Even in the case where the negative electrode active material does not contain lithium ions, the secondary cell system can be provided with lithium ions.

A positive electrode active material prepared by a method for preparing a positive electrode active material for a secondary cell according to the present invention, and a secondary cell produced by a method for producing a secondary cell according to the present invention, were evaluated in terms of characteristics. Hereinafter, the evaluation results will be described.

In the following examples, a coin-type secondary cell was produced, the characteristics of the positive electrode active material were evaluated by evaluating the characteristics of the coin-type secondary cell. The evaluation was conducted in conformation to a usual evaluation method used on secondary cells.

EXAMPLE 1

First, a solution for oxidizing a positive electrode active material was produced. As an electrochemically oxidizable/reducible organic compound for oxidizing the positive electrode active material, bisethylenedithiotetrathiafulvalene represented by general formula (28) in which $X_1$ through $X_4$ are each a sulfur element and $R_1$ through $R_4$ and $R_5$ through $R_8$ are each hydrogen was used. For producing the solution, bisethylenedithiotetrathiafulvalene needs to be oxidized. For this purpose, an electrode containing bisethylenedithiotetrathiafulvalene was first produced as follows.

50 mg of bisethylenedithiotetrathiafulvalene as an electrochemically oxidizable/reducible organic compound and 200 mg of acetylene black as a conduction assisting agent were mixed until being mixed uniformly, and 1 mL of N-methylpyrrolidone as a solvent was added thereto. Then, 50 mg of vinylidene polyfluoride as a binder was added in order to bind the electrode active material and the conduction assisting agent, and mixed until the substances were uniformly mixed to obtain a black paste. The black paste was applied to an aluminum foil current collector and dried at room temperature for 1 hour in vacuum. After being dried, the resultant substance was punched into a 1-mm square to be used as an electrode.

Propylene carbonate was used as a solvent. More specifically, propylene carbonate having 1 M/L lithium borofluoride as a supporting electrolyte dissolved therein was used.

The electrode produced by the above-described method and a negative electrode formed of lithium metal (thickness: 300 μm) were immersed in 12 g of an electrolyte solution, and a voltage was applied thereto under the conditions of a potential range of 4.0 V to 2.0 V and a current value of 0.12 mA. By the application of the voltage, bisethylenedithiotetrathiafulvalene in the electrode was oxidized and eluted into propylene carbonate. This occurred because oxidized bisethylenedithiotetrathiafulvalene has a higher solubility in propylene carbonate than reduced bisethylenedithiotetrathiafulvalene. From the resultant substance, the electrodes were removed and only the solution was collected to be used as a solution for oxidizing the positive electrode active material. The concentration of bisethylenedithiotetrathiafulvalene in the solution was about 0.01 wt %.

An electrode containing bisethylenedithiotetrathiafulvalene in a reduced state as the positive electrode active material was immersed in the solution to put the two substances into contact with each other. The electrode used in this step was produced in the same manner as described above to be used as the positive electrode of the secondary cell.

The progress of the oxidation reaction of the positive electrode active material was checked by measuring the potential thereof with respect to the Li counter electrode. The results are shown in FIG. 1. From FIG. 1, it is understood that as the time passes, the potential of the positive electrode active material increases whereas the potential of the solution decreases.

Bisethylenedithiotetrathiafulvalene is colored blue in an oxidation state and is colored green to yellow in a reduced state. It was confirmed that as the solution oxidized the positive electrode active material, the color of the solution changed from blue to green. This indicates that the charging solution containing the organic compound in an oxidation state having a potential of 3.4 V with respect to the Li reference electrode, and the positive electrode active material in a reduced state having a potential of 3.2 V with respect to the Li reference electrode, contacted each other in the electrolyte solution to cause electron transfer, and as a result, the positive electrode active material was oxidized. Four hours later and after that, the potential of the positive electrode active material is higher than the potential of the solution. Such a result is considered to have been presented by a measurement error because this is impossible theoretically. Such an error is considered to have occurred because as the potential of the solution, the potential of only the organic compound located in the vicinity of the electrode, which was the measurement target, was measured.

Figure 3:
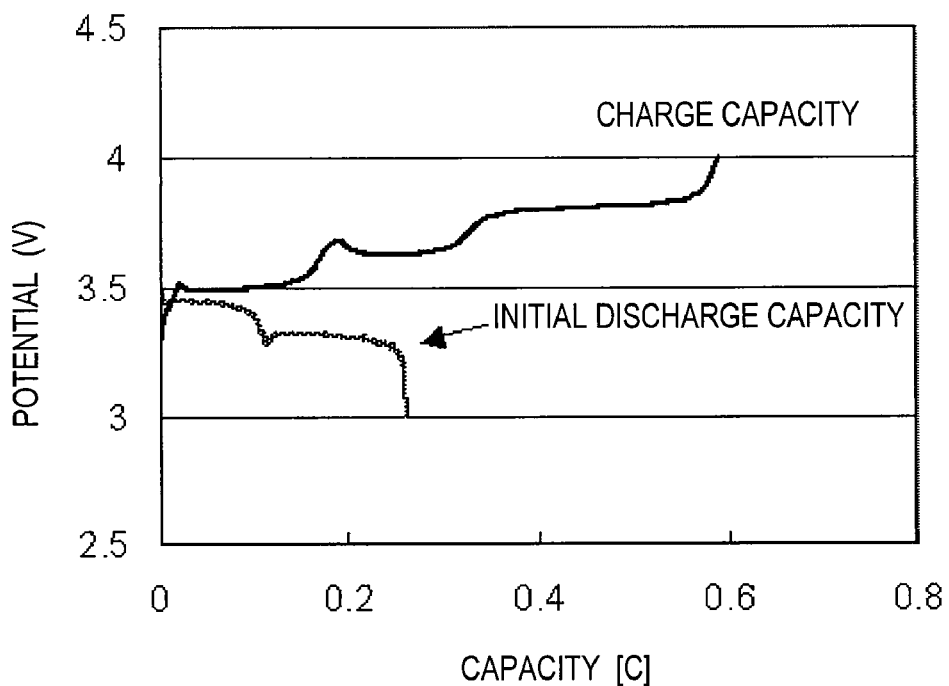
FIG. 3 shows the initial discharge capacity and the charge capacity of a cell including an electrode containing a positive electrode active material oxidized by the method in Example 1 and a counter electrode.

The electrode containing the positive electrode active material oxidized in this manner was collected and discharge was conducted. For the discharge, the electrolyte solution was obtained by dissolving 1 M lithium borofluoride in an electrolyte solution containing ethylene carbonate and dimethoxyethane in a mixed state at a weight ratio of 1:5. As the counter electrode, lithium metal was used. FIG. 3 shows the results of the discharge. The state in which the positive electrode active material is oxidized corresponds to a charged state of a secondary cell. Therefore, as shown in FIG. 3, a discharge capacity is confirmed. Then, a charging reaction was caused, as a result of which it was confirmed that the electrode is chargeable/dischargeable for a cell. Based on this result, it was confirmed that the positive electrode active material can be adjusted to be in an oxidation state (in a charged state of a secondary cell) by a method for preparing a positive electrode active material according to the present invention.

EXAMPLE 2

Next, it was checked whether the cycle deterioration can be suppressed by using the positive electrode active material prepared as described above. A positive electrode oxidized in the same manner as in Example 1 and a counter electrode formed of lithium metal were put into contact with an electrolyte solution obtained by dissolving 1 M lithium borofluoride in an electrolyte solution containing ethylene carbonate and dimethoxyethane in a mixed state at a weight ratio of 1:5. A charge/discharge cycle test was performed using a coin-type cell.

Figure 2:
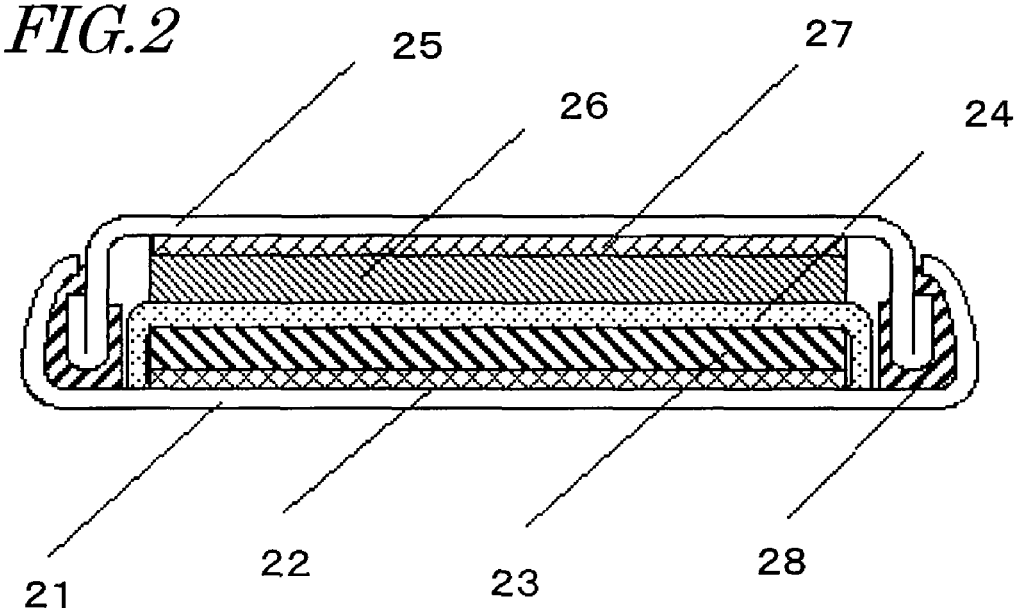
FIG. 2 is a cross-sectional view showing a structure of a coin-type secondary cell.

FIG. 2 shows a structure in a vertical cross-section of the coin-type cell used for the evaluation. The cell was produced as follows.

A positive electrode 23 was placed on a current collecting plate 22 provided in a case 21, and a separator 24 formed of a porous polyethylene sheet was located thereon. Next, 70 μl of an electrolyte solution was injected to the case. The electrolyte solution was obtained by dissolving lithium hexafluorophosphate having a molar concentration of 1 M in a solvent containing ethylene carbonate and dimethoxyethane in a mixed state at a weight ratio of 1:5. Next, an opening sealing plate 25, having a negative electrode 26 pressure-contacted on an inner surface thereof and a gasket 28 fit on a periphery thereof, was assembled with the case 21, and the assembly was caulked by a press machine to seal the opening. Thus, the coin-type cell for evaluating the characteristics was obtained.

The coin-type cell produced in this manner was charged/discharged at a constant current under the conditions of a current of the positive electrode of 0.1 mA and a voltage range of 2.5 V to 4.0 V. The results are shown in FIG. 4.

COMPARATIVE EXAMPLE 1

A cell was produced in the same manner as in Example 2 except that the positive electrode active material was not oxidized by a method for preparing a positive electrode active material according to the present invention. A charge/discharge cycle test was performed in the same manner as in Example 2. The results are shown in FIG. 4.

Figure 4:
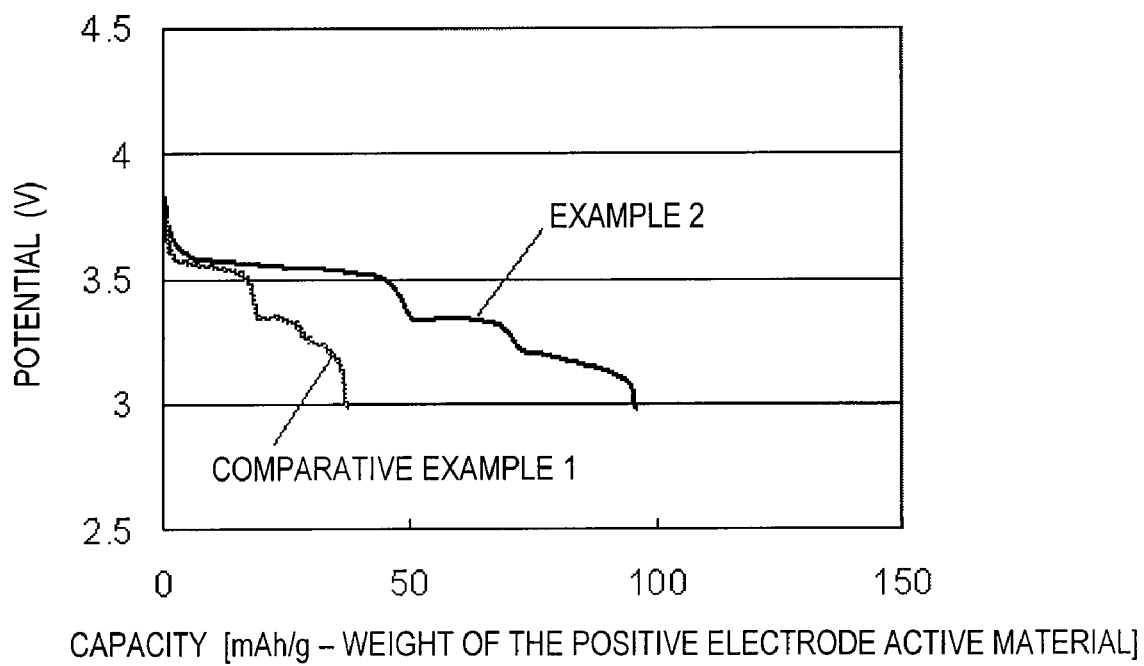
FIG. 4 shows charge/discharge characteristics of secondary cells in Example 2 and Comparative Example 1.

As is clear from FIG. 4, the secondary cell in Comparative Example 1 has a smaller initial capacitance than the secondary cell in Example 2 in which the positive electrode active material was oxidized. This is considered to have occurred for the following reason. The amount of the electrolyte solution used to produce the secondary cell in Comparative Example 1 is the same as that for the secondary cell in Example 2. However, in Comparative Example 1, the positive electrode active material was not oxidized and therefore $PF_6^-$ as counter ions was not incorporated into the positive electrode active material. Hence, the total amount of $PF_6^-$ in the secondary cell in Comparative Example 1 is smaller than that in Example 2, and the amount of $PF_6^-$ usable for charge/discharge is not sufficient in Comparative Example 1.

In Comparative Example 1, because the amount of $PF_6^-$ is not sufficient, the inner resistance of the secondary cell is increased. As a result, the voltage applied for charge/discharge is increased. As the charge/discharge is repeated, cycle deterioration is caused. By contrast, the secondary cell in Example 2 exhibited a good cycle characteristic over 50 cycles of the cycle test.

EXAMPLE 3

A positive electrode active material was prepared using lithium cobalt oxide in the same manner as in Example 1. In the case where lithium cobalt oxide is used, the positive electrode active material is reduced by a method for preparing a positive electrode active material according to the present invention in order to incorporate lithium ions into the positive electrode active material.

As an organic compound to be dissolved in the solution, bisethylenedithiotetrathiafulvalene was used as in Example 1.

Figure 5:
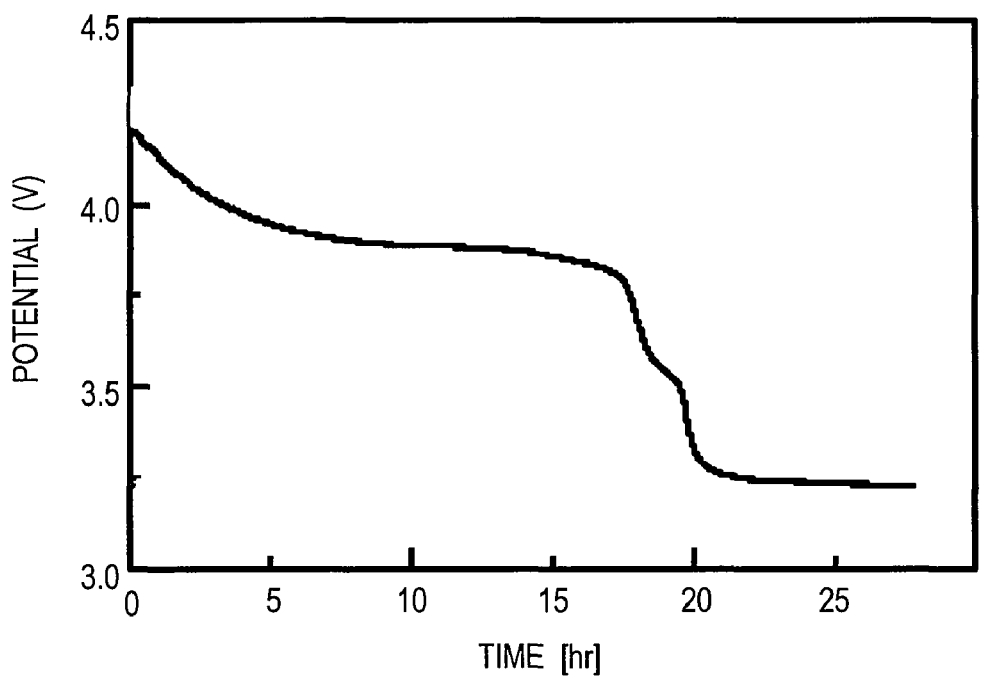
FIG. 5 shows a potential change in the case where the positive electrode active material is oxidized by a method in Example 3.

FIG. 5 shows the potential, with respect to the Li counter electrode, obtained while lithium cobalt oxide as the positive electrode active material was reduced. As is clear from FIG. 5, as the time passes, the potential of lithium cobalt oxide decreases from 4.2 V. From this, it is understood that the positive electrode active material is reduced.

Figure 6:
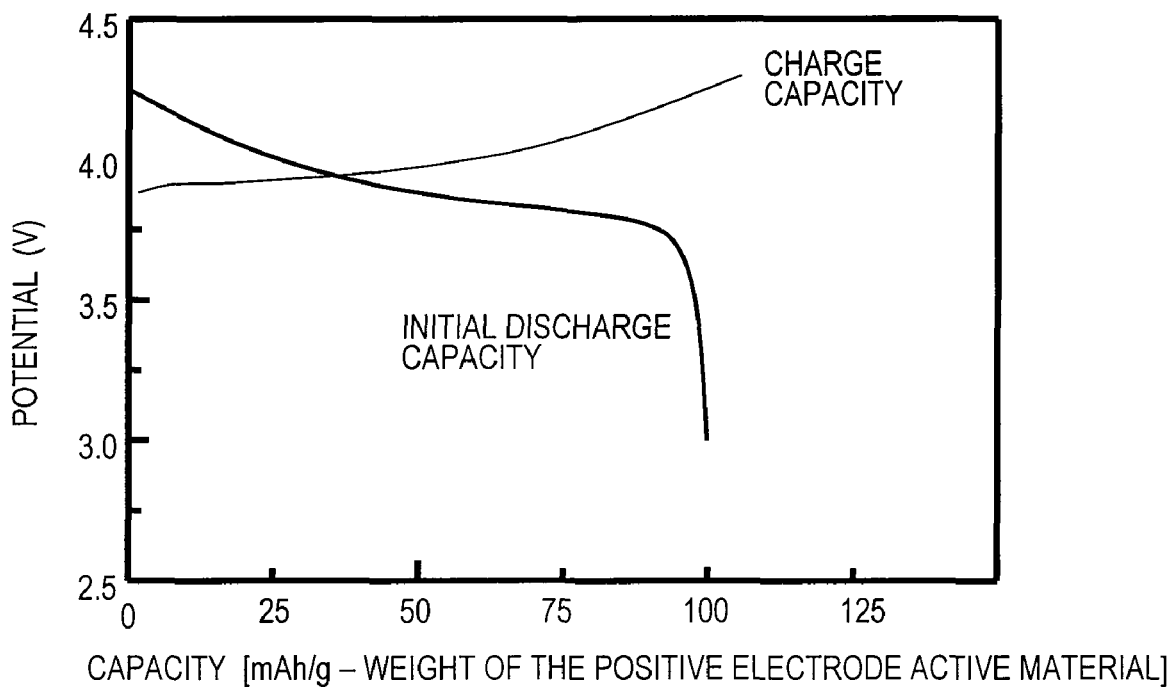
FIG. 6 shows the initial discharge capacity and the charge capacity of a cell including an electrode containing a positive electrode active material oxidized by the method in Example 3 and a counter electrode.

The electrode containing the positive electrode active material reduced in this manner was collected and charge was conducted. For the charge, the electrolyte solution was obtained by dissolving 1 M lithium hexafluorophosphate in an electrolyte solution containing ethylene carbonate and ethylmethyl carbonate in a mixed state at a weight ratio of 1:1. As the counter electrode, lithium metal was used. FIG. 6 shows the results of the charge. The state in which the positive electrode active material is reduced corresponds to a discharged state of a secondary cell. Therefore, as shown in FIG. 6, the initial discharge capacity was low. Then, a charging reaction was caused, as a result of which it was confirmed that the electrode is chargeable/dischargeable for a cell. Based on this result, it was confirmed that the positive electrode active material can be adjusted to be in a reduced state (in a discharged state of a secondary cell) by a method for preparing a positive electrode active material according to the present invention.

Based on the above results, it was found that by oxidizing or reducing an electrochemically oxidizable/reducible organic compound and putting a solution containing the resultant organic compound into contact with the positive electrode active material, the positive electrode active material can be oxidized or reduced to incorporate anions or lithium ions into the positive electrode active material in advance. It was also found that owing to this, a large capacity cell can be realized without the cell capacity being restricted by the ion concentration in the electrolyte solution.

Industrial Applicability

A method for preparing a positive electrode active material for a secondary cell according to the present invention, and a method for producing a secondary cell according to the present invention, are preferably usable for large-output, lightweight and large-capacity electricity storage devices.

The invention claimed is:

1. A method for producing a secondary cell, the method comprising:
   step (A) of putting a solution having an electrochemically reversibly oxidizable/reducible organic compound and a supporting electrolyte dissolved therein into contact with a positive electrode active material, thereby oxidizing or reducing the positive electrode active material; and
   step (B) of accommodating the positive electrode active material processed by the step (A) and a negative electrode active material in a case in the state of facing each other with a separator being placed therebetween, and filling the case with an electrolyte solution,
   wherein the step (A) further comprises immersing an electrode containing the organic compound and a counter electrode in the solution having the supporting electrolyte dissolved therein, and applying a voltage between the electrode and the counter electrode, thereby oxidizing or reducing the organic compound and thus dissolving the organic compound in the solution.

2. The method of claim 1, wherein the organic compound is at least one selected from the group consisting of an organic compound having a quinone group in a molecule thereof, an organic compound having a sulfide group in a molecule thereof, an organic compound having a pyrimidine structure in a molecule thereof, an organic compound having a nitroxy radical group in a molecule thereof, and an organic compound having a π-conjugated electron cloud in a molecule thereof.

3. The method of claim 2, wherein the organic compound is a low molecular weight compound.

4. The method of claim 2, wherein the organic compound has a tetrathiafulvalene structure.

5. The method of claim 4, wherein the organic compound is bisethylenedithiotetrathiafulvalene.

6. The method of claim 5, wherein the positive electrode active material is at least one selected from bisethylenedithiotetrathiafulvalene, $LiCoO_2$, $LiNiO_2$ and $LiMn_2O_4$.

7. The method of claim 6, wherein in the step (A), the solution is flown with respect to, and thus put into contact with, the positive electrode active material.

8. A method for preparing a positive electrode active material for a secondary cell, the method comprising:
   putting a solution having an electrochemically reversibly oxidizable/reducible organic compound and a supporting electrolyte dissolved therein into contact with the positive electrode active material, thereby oxidizing or reducing the positive electrode active material,
   wherein the oxidizing or reducing further comprises immersing an electrode containing the organic compound and a counter electrode in the solution having the supporting electrolyte dissolved therein, and applying a voltage between the electrode and the counter electrode, thereby oxidizing or reducing the organic compound and thus dissolving the organic compound in the solution.

9. The method of claim 8, wherein the organic compound is at least one selected from the group consisting of an organic compound having a quinone group in a molecule thereof, an organic compound having a sulfide group in a molecule thereof, an organic compound having a pyrimidine structure in a molecule thereof, an organic compound having a nitroxy radical group in a molecule thereof, and an organic compound having a π conjugated electron cloud in a molecule thereof.

10. The method of claim 9, wherein the organic compound is a low molecular weight compound.

11. The method of claim 9, wherein the organic compound has a tetrathiafulvalene structure.

12. The method of claim 11, wherein the organic compound is bisethylenedithiotetrathiafulvalene.

13. The method of claim 12, wherein the positive electrode active material is at least one selected from bisethylenedithiotetrathiafulvalene, $LiCoO_2$, $LiNiO_2$ and $LiMn_2O_4$.

14. The method of claim 13, wherein in the oxidizing or reducing, the solution is flown with respect to, and thus put into contact with, the positive electrode active material.

* * * * *